US008354279B2

(12) United States Patent
Nguyen et al.

(10) Patent No.: US 8,354,279 B2
(45) Date of Patent: Jan. 15, 2013

(54) METHODS OF TRACKING FLUIDS PRODUCED FROM VARIOUS ZONES IN A SUBTERRANEAN WELL

(75) Inventors: Philip D. Nguyen, Duncan, OK (US); Jimmie D. Weaver, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1558 days.

(21) Appl. No.: 10/777,412

(22) Filed: Feb. 12, 2004

(65) Prior Publication Data
US 2004/0162224 A1 Aug. 19, 2004

Related U.S. Application Data

(60) Division of application No. 10/298,825, filed on Nov. 18, 2002, now Pat. No. 6,725,926, which is a continuation-in-part of application No. 10/125,171, filed on Apr. 18, 2002, now Pat. No. 6,691,780.

(51) Int. Cl.
G01N 33/28 (2006.01)
C09K 8/80 (2006.01)
E21B 47/10 (2006.01)

(52) U.S. Cl. ............. 436/27; 436/25; 436/31; 507/934; 166/280.2

(58) Field of Classification Search .................. 507/924; 166/280.2; 436/27, 31, 25
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,052,298 A | 9/1962 | Malott | |
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | |
| 3,329,204 A | 7/1967 | Brieger | |
| 3,336,980 A | 8/1967 | Rike | |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | |
| 3,525,398 A | 8/1970 | Fisher | |
| 3,565,176 A | 2/1971 | Wittenwyler | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismukes | |
| 3,709,298 A | 1/1973 | Pramann | |
| 3,709,641 A | 1/1973 | Sarem | |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,850,247 A | 11/1974 | Tinsley | |
| 3,854,533 A | 12/1974 | Gurley et al. | 166/276 |
| 3,856,468 A | 12/1974 | Keller | |
| 3,857,444 A | 12/1974 | Copeland | 166/276 |
| 3,861,467 A | 1/1975 | Harnsberger | |
| 3,863,709 A | 2/1975 | Fitch | |
| 3,868,998 A | 3/1975 | Lybarger et al. | 166/278 |
| 3,878,890 A | 4/1975 | Fertl et al. | |
| 3,888,311 A | 6/1975 | Cooke, Jr. | 166/280 |

(Continued)

FOREIGN PATENT DOCUMENTS

CA 2063877 5/2003

(Continued)

OTHER PUBLICATIONS

Office action dated Mar. 18, 2005 from U.S. Appl. No. 10/741,557, appl. publ. Jul. 8, 2004 as US PGPUB 20040129923.
Office action dated Jul. 6, 2005 from U.S. Appl. No. 10/741,557, appl. publ. Jul. 8, 2004 as US PGPUB 20040129923.
"Santrol Bioballs"; http://www.fairmounminerals.com/.sub.--SANTROL/SANTROL%20Web%20Site/B.sub- .--TD.htm, Sep. 30, 2004.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., Controlling Proppant Flowback in High-Temperature, High-Production Wells, SPE 82215, May 2003.
Dusterhoft, et al., "Maximizing Effective Proppant Permeability Under High-Stress, High Gas-Rate Conditions," SPE 90398, Sep. 2004.
Halliburton, *CoalStim*[SM] *Service, Helps Boost Cash Flow From CBM Assets*, Stimulation, HO3679 Oct. 2003, Halliburton Communications.

(Continued)

*Primary Examiner* — Daniel S Metzmaier
(74) *Attorney, Agent, or Firm* — Robert A. Kent; McDermott Will & Emery LLP

(57) ABSTRACT

Compositions and methods for determining the source of treatment fluids being produced from a production formation having multiple zones by introducing a treatment composition having a tracking material into a zone in the subterranean formation, and detecting the tracking material in treatment composition that flows back from the subterranean formation.

12 Claims, No Drawings

U.S. PATENT DOCUMENTS

| | | | | |
|---|---|---|---|---|
| 3,912,692 A | 10/1975 | Casey et al. ............... 260/78.3 |
| 3,933,205 A | 1/1976 | Kiel |
| 3,948,672 A | 4/1976 | Harnsberger ................ 106/90 |
| 3,955,993 A | 5/1976 | Curtice ....................... 106/90 |
| 3,960,736 A | 6/1976 | Free et al. ............... 252/8.55 R |
| 4,000,781 A | 1/1977 | Knapp |
| 4,008,763 A | 2/1977 | Lowe et al. ................ 166/253 |
| 4,015,995 A | 4/1977 | Hess |
| 4,018,285 A | 4/1977 | Watkins et al. |
| 4,029,148 A | 6/1977 | Emery .................... 166/250.1 |
| 4,031,958 A | 6/1977 | Sandiford et al. .......... 166/270 |
| 4,042,032 A | 8/1977 | Anderson et al. .......... 166/276 |
| 4,060,988 A | 12/1977 | Arnold |
| 4,068,718 A | 1/1978 | Cooke, Jr. et al. |
| 4,070,865 A | 1/1978 | McLaughlin ................. 61/36 |
| 4,074,760 A | 2/1978 | Copeland et al. .......... 166/276 |
| 4,085,801 A | 4/1978 | Sifferman et al. |
| 4,085,802 A | 4/1978 | Sifferman et al. |
| 4,089,437 A | 5/1978 | Chutter et al. |
| 4,127,173 A | 11/1978 | Watkins et al. ............ 166/276 |
| 4,169,798 A | 10/1979 | DeMartino ............ 252/8.55 R |
| 4,172,066 A | 10/1979 | Zweigle et al. ........ 260/29.6 TA |
| 4,245,702 A | 1/1981 | Haafkens et al. ........... 166/307 |
| 4,247,430 A | 1/1981 | Constien |
| 4,259,205 A | 3/1981 | Murphey |
| 4,273,187 A | 6/1981 | Satter et al. |
| 4,291,766 A | 9/1981 | Davies et al. .............. 166/276 |
| 4,305,463 A | 12/1981 | Zakiewicz ................. 106/245 |
| 4,336,842 A | 6/1982 | Graham et al. ............ 166/276 |
| 4,352,674 A | 10/1982 | Fery |
| 4,353,806 A | 10/1982 | Canter et al. .............. 507/229 |
| 4,387,769 A | 6/1983 | Erbstoesser et al. ........ 166/295 |
| 4,392,988 A | 7/1983 | Dobson et al. |
| 4,399,866 A | 8/1983 | Dearth |
| 4,415,805 A | 11/1983 | Fertl et al. |
| 4,428,427 A | 1/1984 | Friedman |
| 4,439,489 A | 3/1984 | Johnson et al. ............ 428/404 |
| 4,441,556 A | 4/1984 | Powers et al. |
| 4,443,347 A | 4/1984 | Underdown et al. ..... 252/8.55 R |
| 4,447,340 A * | 5/1984 | FeJean-Jacques ........... 507/103 |
| 4,460,052 A | 7/1984 | Gockel ...................... 175/72 |
| 4,470,915 A | 9/1984 | Conway ............... 252/8.55 R |
| 4,473,669 A | 9/1984 | Rupert et al. |
| 4,493,875 A | 1/1985 | Beck et al. ................ 428/403 |
| 4,494,605 A | 1/1985 | Wiechel et al. ............ 166/288 |
| 4,498,995 A | 2/1985 | Gockel .................. 252/8.5 LC |
| 4,501,328 A | 2/1985 | Nichols .................... 166/288 |
| 4,526,695 A | 7/1985 | Erbstosser et al. ...... 252/8.55 R |
| 4,527,627 A | 7/1985 | Graham et al. ............. 66/280 |
| 4,541,489 A | 9/1985 | Wu ........................... 166/312 |
| 4,542,789 A | 9/1985 | Stapp |
| 4,546,012 A | 10/1985 | Brooks ..................... 427/213 |
| 4,553,596 A | 11/1985 | Graham et al. ............ 166/295 |
| 4,564,459 A | 1/1986 | Underdown et al. ..... 252/8.55 R |
| 4,572,803 A | 2/1986 | Yamazoe et al. ............ 534/16 |
| 4,585,064 A | 4/1986 | Graham et al. |
| 4,649,998 A | 3/1987 | Friedman .................. 166/294 |
| 4,654,266 A * | 3/1987 | Kachnik .................... 428/403 |
| 4,664,819 A | 5/1987 | Glaze et al. ............... 252/8.551 |
| 4,665,988 A | 5/1987 | Murphey et al. ........... 166/295 |
| 4,669,543 A | 6/1987 | Young ...................... 166/276 |
| 4,670,501 A | 6/1987 | Dymond et al. |
| 4,675,140 A | 6/1987 | Sparks et al. ................ 264/4.3 |
| 4,677,187 A * | 6/1987 | Armbruster et al. ........ 528/232 |
| 4,681,165 A | 7/1987 | Bannister |
| 4,683,954 A | 8/1987 | Walker et al. .............. 166/307 |
| 4,694,905 A | 9/1987 | Armbruster ................ 166/280 |
| 4,715,967 A | 12/1987 | Bellis ....................... 252/8.551 |
| 4,716,964 A | 1/1988 | Erbstoesser et al. ........ 166/284 |
| 4,733,729 A | 3/1988 | Copeland .................. 166/276 |
| 4,739,832 A | 4/1988 | Jennings, Jr. et al. ........ 166/299 |
| 4,741,401 A * | 5/1988 | Walles et al. ............... 166/300 |
| 4,756,844 A * | 7/1988 | Walles et al. ............... 510/302 |
| 4,772,646 A | 9/1988 | Harms et al. |
| 4,777,200 A | 10/1988 | Dymond et al. |
| 4,785,884 A * | 11/1988 | Armbruster ................ 166/280.2 |
| 4,787,453 A | 11/1988 | Hewgill et al. ............ 166/272.3 |
| 4,789,105 A | 12/1988 | Hosokawa et al. ........... 241/67 |
| 4,796,701 A | 1/1989 | Hudson et al. .............. 166/278 |
| 4,797,262 A | 1/1989 | Dewitz ...................... 422/142 |
| 4,800,960 A | 1/1989 | Friedman et al. ............ 166/276 |
| 4,807,469 A * | 2/1989 | Hall ............................ 436/27 |
| 4,809,783 A | 3/1989 | Hollenbeck et al. .......... 166/307 |
| 4,817,721 A | 4/1989 | Pober ......................... 166/295 |
| 4,829,100 A | 5/1989 | Murphey et al. ............ 523/131 |
| 4,838,352 A | 6/1989 | Oberste-Padtberg et al. 166/291 |
| 4,842,070 A | 6/1989 | Sharp |
| 4,842,072 A | 6/1989 | Friedman et al. ............ 166/295 |
| 4,843,118 A | 6/1989 | Lai et al. ..................... 524/555 |
| 4,848,467 A | 7/1989 | Cantu et al. ................. 166/281 |
| 4,848,470 A | 7/1989 | Korpics ....................... 166/312 |
| 4,850,430 A | 7/1989 | Copeland et al. ............ 166/276 |
| 4,875,525 A | 10/1989 | Mana |
| 4,886,354 A | 12/1989 | Welch et al. ................. 356/70 |
| 4,888,240 A | 12/1989 | Graham et al. ............. 428/403 |
| 4,892,147 A | 1/1990 | Jennings, Jr. et al. |
| 4,895,207 A | 1/1990 | Friedman et al. ............ 166/276 |
| 4,898,750 A | 2/1990 | Friedman et al. |
| 4,903,770 A | 2/1990 | Friedman et al. ............ 166/288 |
| 4,921,576 A | 5/1990 | Hurd |
| 4,934,456 A | 6/1990 | Moradi-Araghi ............ 166/270 |
| 4,936,385 A | 6/1990 | Weaver et al. ............... 166/288 |
| 4,942,186 A | 7/1990 | Murphey et al. ............ 523/131 |
| 4,957,165 A | 9/1990 | Cantu et al. ................. 166/295 |
| 4,959,432 A | 9/1990 | Fan et al. ..................... 526/287 |
| 4,961,466 A | 10/1990 | Himes et al. ................ 166/250 |
| 4,969,522 A | 11/1990 | Whitehurst et al. .......... 166/278 |
| 4,969,523 A | 11/1990 | Martin et al. ................ 166/278 |
| 4,984,635 A | 1/1991 | Cullick et al. |
| 4,986,353 A | 1/1991 | Clark et al. ................. 166/279 |
| 4,986,354 A | 1/1991 | Cantu et al. ................. 166/279 |
| 4,986,355 A | 1/1991 | Casad et al. ................. 166/295 |
| 4,987,960 A * | 1/1991 | Darlington .................... 436/27 |
| 5,030,603 A | 7/1991 | Rumpf et al. ............... 501/127 |
| 5,049,743 A | 9/1991 | Taylor, III et al. |
| 5,056,597 A | 10/1991 | Stowe, III et al. |
| 5,082,056 A | 1/1992 | Tackett, Jr. .................. 166/295 |
| 5,095,987 A | 3/1992 | Weaver et al. |
| 5,105,886 A | 4/1992 | Strubhar et al. |
| 5,107,928 A | 4/1992 | Hilterhaus ................... 166/293 |
| 5,128,390 A | 7/1992 | Murphey et al. ............ 523/130 |
| 5,135,051 A | 8/1992 | Facteau et al. ............... 166/104 |
| 5,142,023 A | 8/1992 | Gruber et al. ............... 528/354 |
| 5,165,438 A | 11/1992 | Fracteau et al. ................ 137/1 |
| 5,173,527 A | 12/1992 | Calve ......................... 524/74 |
| 5,178,218 A | 1/1993 | Dees .......................... 166/281 |
| 5,182,051 A | 1/1993 | Bandy et al. |
| 5,199,491 A | 4/1993 | Kutts et al. .................. 166/276 |
| 5,199,492 A | 4/1993 | Surles et al. ................. 166/295 |
| 5,211,234 A | 5/1993 | Floyd .......................... 166/276 |
| 5,216,050 A | 6/1993 | Sinclair ....................... 524/108 |
| 5,218,038 A | 6/1993 | Johnson et al. .............. 524/541 |
| 5,232,955 A | 8/1993 | Caabai et al. ................. 521/63 |
| 5,232,961 A | 8/1993 | Murphey et al. ............ 523/414 |
| 5,238,068 A | 8/1993 | Fredickson ................. 166/307 |
| 5,244,362 A | 9/1993 | Conally et al. |
| 5,247,059 A | 9/1993 | Gruber et al. ............... 528/354 |
| 5,249,627 A | 10/1993 | Harms et al. |
| 5,249,628 A | 10/1993 | Surjaatmadja ............... 166/305 |
| 5,256,729 A | 10/1993 | Kutts et al. .................. 524/700 |
| 5,265,678 A | 11/1993 | Grundmann |
| 5,273,115 A | 12/1993 | Spafford ..................... 166/281 |
| 5,278,203 A | 1/1994 | Harms |
| 5,285,849 A | 2/1994 | Surles et al. ................. 166/295 |
| 5,293,939 A | 3/1994 | Surles et al. ................. 166/295 |
| 5,295,542 A | 3/1994 | Cole et al. ................... 166/278 |
| 5,320,171 A | 6/1994 | Laramay ..................... 166/285 |
| 5,321,062 A | 6/1994 | Landrum et al. ............. 523/141 |
| 5,325,923 A | 7/1994 | Surjaatmadja et al. ....... 166/308 |
| 5,330,005 A | 7/1994 | Card et al. ................... 166/280 |
| 5,332,037 A | 7/1994 | Schmidt et al. .............. 166/276 |
| 5,335,726 A | 8/1994 | Rodrogues .................. 166/295 |
| 5,351,754 A | 10/1994 | Hardin et al. ................ 166/249 |
| 5,358,051 A | 10/1994 | Rodrigues ................... 166/295 |
| 5,359,026 A | 10/1994 | Gruber ........................ 528/354 |
| 5,360,068 A | 11/1994 | Sprunt et al. ................ 166/259 |
| 5,361,856 A | 11/1994 | Surjaatmajda et al. ........ 175/67 |

| | | | |
|---|---|---|---|
| 5,363,916 A | 11/1994 | Himes et al. ............... 166/276 |
| 5,373,901 A | 12/1994 | Norman et al. ............. 166/300 |
| 5,377,756 A | 1/1995 | Northrop et al. |
| 5,377,759 A | 1/1995 | Surles |
| 5,381,864 A | 1/1995 | Nguyen et al. ............. 166/280 |
| 5,386,874 A | 2/1995 | Laramay et al. ............ 166/300 |
| 5,388,648 A | 2/1995 | Jordan, Jr. ................. 166/380 |
| 5,390,741 A | 2/1995 | Payton et al. |
| 5,393,810 A | 2/1995 | Harris et al. ............... 524/56 |
| 5,396,957 A | 3/1995 | Surjaatmadja et al. ....... 166/308 |
| 5,402,846 A | 4/1995 | Jennings, Jr. et al. ........ 166/259 |
| 5,403,822 A | 4/1995 | Mueller et al. |
| 5,420,174 A * | 5/1995 | Dewprashad ............... 523/130 |
| 5,422,183 A | 6/1995 | Sinclair et al. .............. 428/403 |
| 5,423,381 A | 6/1995 | Surles et al. ................ 166/295 |
| 5,425,994 A * | 6/1995 | Harry et al. ................ 428/403 |
| 5,439,055 A | 8/1995 | Card et al. |
| 5,460,226 A | 10/1995 | Lawson et al. ............. 166/300 |
| 5,464,060 A | 11/1995 | Hale et al. ................. 166/293 |
| 5,475,080 A | 12/1995 | Gruber et al. .............. 528/354 |
| 5,484,881 A | 1/1996 | Gruber et al. .............. 528/54 |
| 5,492,177 A | 2/1996 | Yeh et al. |
| 5,492,178 A | 2/1996 | Nguyen et al. ............. 166/276 |
| 5,494,103 A | 2/1996 | Surjaatmadja et al. ....... 166/222 |
| 5,497,830 A | 3/1996 | Boles et al. ................ 166/300 |
| 5,498,280 A | 3/1996 | Fistner et al. |
| 5,499,678 A | 3/1996 | Surjaatmadja et al. ....... 166/298 |
| 5,501,275 A | 3/1996 | Card et al. ................. 166/280 |
| 5,505,787 A | 4/1996 | Yamaguchi ................ 134/4 |
| 5,512,071 A | 4/1996 | Yam et al. .................. 51/307 |
| 5,520,250 A | 5/1996 | Harry et al. ................ 166/278 |
| 5,522,460 A | 6/1996 | Shu .......................... 166/295 |
| 5,529,123 A | 6/1996 | Carpenter et al. ........... 166/293 |
| 5,531,274 A | 7/1996 | Bienvenu, Jr. .............. 166/300 |
| 5,536,807 A | 7/1996 | Gruber et al. .............. 528/354 |
| 5,545,824 A | 8/1996 | Stengel et al. .............. 524/590 |
| 5,547,023 A | 8/1996 | McDaniel et al. ........... 166/280 |
| 5,551,513 A | 9/1996 | Suries et al. ............... 166/278 |
| 5,551,514 A | 9/1996 | Nelson et al. .............. 166/280 |
| 5,582,249 A | 12/1996 | Caveny et al. .............. 166/276 |
| 5,582,250 A * | 12/1996 | Constien .................... 166/280.1 |
| 5,588,488 A | 12/1996 | Vijn et al. .................. 166/293 |
| 5,591,700 A | 1/1997 | Harris et al. ............... 507/204 |
| 5,594,095 A | 1/1997 | Gruber et al. .............. 528/354 |
| 5,595,245 A | 1/1997 | Scott, III |
| 5,597,784 A | 1/1997 | Sinclair et al. |
| 5,604,184 A | 2/1997 | Ellis et al. .................. 507/117 |
| 5,604,186 A | 2/1997 | Hunt et al. ................. 507/204 |
| 5,609,207 A | 3/1997 | Dewprashad et al. |
| 5,620,049 A | 4/1997 | Gipson et al. .............. 166/248 |
| 5,639,806 A | 6/1997 | Johnson et al. ............. 523/208 |
| 5,663,123 A | 9/1997 | Goodhue, Jr. et al. |
| 5,670,473 A | 9/1997 | Scepanski ................... 510/445 |
| 5,692,566 A | 12/1997 | Surles |
| 5,697,440 A | 12/1997 | Weaver et al. .............. 166/281 |
| 5,697,448 A | 12/1997 | Johnson |
| 5,698,322 A | 12/1997 | Tsai et al. ................... 428/373 |
| 5,701,956 A | 12/1997 | Hardy et al. |
| 5,712,314 A | 1/1998 | Surles et al. ............... 521/41 |
| 5,732,364 A | 3/1998 | Kalb et al. |
| 5,738,136 A | 4/1998 | Rosenberg |
| 5,765,642 A | 6/1998 | Surjaatmadja .............. 166/297 |
| 5,775,425 A | 7/1998 | Weaver et al. .............. 166/276 |
| 5,782,300 A | 7/1998 | James et al. ................ 166/278 |
| 5,783,822 A | 7/1998 | Buchanan et al. |
| 5,787,986 A | 8/1998 | Weaver et al. .............. 166/280 |
| 5,791,415 A | 8/1998 | Nguyen et al. ............. 166/280 |
| 5,799,734 A | 9/1998 | Norman et al. ............. 166/278 |
| 5,806,593 A | 9/1998 | Suries ....................... 166/270 |
| 5,830,987 A | 11/1998 | Smith ........................ 528/332 |
| 5,833,000 A | 11/1998 | Weaver et al. .............. 166/276 |
| 5,833,361 A | 11/1998 | Funk ......................... 366/80 |
| 5,836,391 A | 11/1998 | Jonasson et al. ............ 166/295 |
| 5,836,392 A | 11/1998 | Urlwin-Smith ............. 166/295 |
| 5,836,393 A | 11/1998 | Johnson |
| 5,837,656 A | 11/1998 | Sinclair et al. .............. 507/220 |
| 5,837,785 A | 11/1998 | Kinsho et al. .............. 525/527 |
| 5,839,510 A | 11/1998 | Weaver et al. .............. 166/276 |
| 5,840,784 A | 11/1998 | Funkhouser et al. ......... 523/130 |
| 5,849,401 A | 12/1998 | El-Afandi et al. ........... 428/215 |
| 5,849,590 A | 12/1998 | Anderson, II et al. |
| 5,853,048 A | 12/1998 | Weaver et al. .............. 166/279 |
| 5,864,003 A | 1/1999 | Qureshi et al. .............. 528/141 |
| 5,865,936 A | 2/1999 | Edelman et al. ............. 156/310 |
| 5,871,049 A | 2/1999 | Weaver et al. .............. 166/276 |
| 5,873,413 A | 2/1999 | Chatterji et al. ............ 166/293 |
| 5,875,844 A | 3/1999 | Chatterji et al. ............ 166/293 |
| 5,875,845 A | 3/1999 | Chatterji et al. ............ 166/293 |
| 5,875,846 A | 3/1999 | Chatterji et al. ............ 166/293 |
| 5,893,383 A | 4/1999 | Fracteau ..................... 137/14 |
| 5,893,416 A | 4/1999 | Read .......................... 166/304 |
| 5,901,789 A | 5/1999 | Donnelly et al. |
| 5,908,073 A | 6/1999 | Nguyen et al. ............. 166/276 |
| 5,911,282 A | 6/1999 | Onan et al. .................. 175/72 |
| 5,916,933 A | 6/1999 | Johnson et al. ............. 523/208 |
| 5,921,317 A | 7/1999 | Dewprashad et al. ........ 166/208 |
| 5,924,488 A | 7/1999 | Nguyen et al. ............. 166/280 |
| 5,929,437 A | 7/1999 | Elliott et al. |
| 5,944,105 A | 8/1999 | Nguyen ..................... 166/278 |
| 5,944,106 A | 8/1999 | Dalrymple et al. |
| 5,945,387 A | 8/1999 | Chatterji et al. ............ 507/224 |
| 5,948,734 A | 9/1999 | Sinclair et al. .............. 507/219 |
| 5,957,204 A | 9/1999 | Chatterji et al. ............ 166/295 |
| 5,960,877 A | 10/1999 | Funkhouser et al. ......... 166/270 |
| 5,960,878 A | 10/1999 | Nguyen et al. |
| 5,960,880 A | 10/1999 | Nguyen et al. ............. 166/280 |
| 5,964,291 A * | 10/1999 | Bourne et al. .............. 166/279 |
| 5,969,006 A | 10/1999 | Onan et al. .................. 523/166 |
| 5,977,283 A | 11/1999 | Rossitto .................... 528/44 |
| 5,994,785 A | 11/1999 | Higuchi et al. .............. 527/789 |
| RE36,466 E | 12/1999 | Nelson et al. .............. 166/280 |
| 6,003,600 A | 12/1999 | Nguyen et al. ............. 166/281 |
| 6,004,400 A | 12/1999 | Bishop et al. ............... 134/2 |
| 6,006,835 A | 12/1999 | Onan et al. .................. 166/295 |
| 6,006,836 A | 12/1999 | Chatterji et al. ............ 166/295 |
| 6,012,524 A | 1/2000 | Chatterji et al. ............ 166/295 |
| 6,016,870 A | 1/2000 | Dewprashad et al. ........ 166/295 |
| 6,024,170 A | 2/2000 | McCabe et al. ............. 166/300 |
| 6,028,113 A | 2/2000 | Scepanski ................... 514/643 |
| 6,028,534 A | 2/2000 | Ciglenec et al. ........... 340/856.2 |
| 6,040,398 A | 3/2000 | Kinsho et al. .............. 525/527 |
| 6,047,772 A | 4/2000 | Weaver et al. |
| 6,059,034 A | 5/2000 | Rickards et al. ............ 166/280 |
| 6,059,035 A | 5/2000 | Chatterji et al. ............ 166/293 |
| 6,059,036 A | 5/2000 | Chatterji et al. ............ 166/294 |
| 6,063,738 A | 5/2000 | Chatterji et al. |
| 6,068,055 A | 5/2000 | Chatterji et al. ............ 166/293 |
| 6,069,117 A | 5/2000 | Onan et al. .................. 507/202 |
| 6,070,667 A | 6/2000 | Gano |
| 6,074,739 A | 6/2000 | Katagiri |
| 6,079,492 A | 6/2000 | Hoogteijling et al. ........ 166/276 |
| 6,098,711 A | 8/2000 | Chatterji et al. ............ 166/294 |
| 6,114,410 A | 9/2000 | Betzold ...................... 523/130 |
| 6,123,871 A | 9/2000 | Carroll |
| 6,123,965 A | 9/2000 | Jacon et al. ................ 424/489 |
| 6,124,246 A | 9/2000 | Heathman et al. ........... 507/219 |
| 6,130,286 A | 10/2000 | Thomas et al. .............. 524/507 |
| 6,131,661 A | 10/2000 | Conner et al. |
| 6,135,987 A | 10/2000 | Tsai et al. ................... 604/365 |
| 6,140,446 A | 10/2000 | Fujiki et al. ................ 528/15 |
| 6,143,698 A | 11/2000 | Murphey et al. |
| 6,148,911 A | 11/2000 | Gipson et al. .............. 166/248 |
| 6,152,234 A | 11/2000 | Newhouse et al. .......... 166/403 |
| 6,162,766 A | 12/2000 | Muir et al. .................. 507/267 |
| 6,165,947 A | 12/2000 | Chang et al. |
| 6,169,058 B1 | 1/2001 | Le et al. ..................... 507/222 |
| 6,172,011 B1 | 1/2001 | Card et al. |
| 6,172,077 B1 | 1/2001 | Curtis et al. ................ 514/278 |
| 6,176,315 B1 | 1/2001 | Reddy et al. ............... 166/295 |
| 6,177,484 B1 | 1/2001 | Surles ........................ 523/131 |
| 6,184,311 B1 | 2/2001 | O'Keefe et al. ............. 525/438 |
| 6,186,228 B1 | 2/2001 | Wegener et al. |
| 6,187,834 B1 | 2/2001 | Thayer et al. ............... 522/15 |
| 6,187,839 B1 | 2/2001 | Eoff et al. ................... 523/130 |
| 6,189,615 B1 | 2/2001 | Sydansk ..................... 166/270 |
| 6,192,985 B1 | 2/2001 | Hinkel et al. |
| 6,192,986 B1 | 2/2001 | Urlwin-Smith ............. 166/295 |
| 6,196,317 B1 | 3/2001 | Hardy ........................ 166/295 |

| Patent No. | Date | Inventors | Class |
|---|---|---|---|
| 6,202,751 B1 | 3/2001 | Chatterji et al. | 166/276 |
| 6,209,643 B1 * | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,310,008 B1 | 10/2001 | Rietjens | |
| 6,311,773 B1 | 11/2001 | Todd et al. | 166/280 |
| 6,315,040 B1 | 11/2001 | Donnelly | |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,342,467 B1 | 1/2002 | Chang et al. | |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,394,181 B2 | 5/2002 | Schnatzmeyer et al. | |
| 6,401,817 B1 | 6/2002 | Griffith et al. | 166/295 |
| 6,405,796 B1 | 6/2002 | Meyer et al. | |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,415,509 B1 | 7/2002 | Echols et al. | |
| 6,422,183 B1 | 7/2002 | Kato | |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,457,518 B1 | 10/2002 | Castano-Mears et al. | |
| 6,458,885 B1 | 10/2002 | Stengel et al. | 524/507 |
| 6,478,092 B2 | 11/2002 | Voll et al. | |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,510,896 B2 | 1/2003 | Bode et al. | |
| 6,520,255 B2 | 2/2003 | Tolman et al. | |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,534,449 B1 | 3/2003 | Gilmour et al. | |
| 6,536,939 B1 | 3/2003 | Blue | |
| 6,538,576 B1 | 3/2003 | Schultz et al. | 340/859.6 |
| 6,543,545 B1 | 4/2003 | Chatterji et al. | 166/381 |
| 6,550,959 B2 | 4/2003 | Huber et al. | |
| 6,552,333 B1 | 4/2003 | Storm et al. | |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,588,926 B2 | 7/2003 | Huber et al. | |
| 6,588,928 B2 | 7/2003 | Huber et al. | |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,609,578 B2 | 8/2003 | Patel et al. | |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,677,426 B2 | 1/2004 | Noro et al. | |
| 6,681,856 B1 | 1/2004 | Chatterji et al. | 166/294 |
| 6,686,328 B1 | 2/2004 | Binder | 510/446 |
| 6,691,780 B2 | 2/2004 | Nguyen et al. | |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,930 B2 | 4/2004 | Boney et al. | |
| 6,725,931 B2 | 4/2004 | Nguyen et al. | 166/280.2 |
| 6,729,404 B2 | 5/2004 | Nguyen et al. | 166/280.2 |
| 6,729,405 B2 | 5/2004 | DiLullo et al. | |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,764,981 B1 | 7/2004 | Eoff et al. | 507/110 |
| 6,766,858 B2 | 7/2004 | Nguyen et al. | 166/300 |
| 6,776,235 B1 | 8/2004 | England | |
| 6,776,236 B1 | 8/2004 | Nguyen | 166/279 |
| 6,832,650 B2 | 12/2004 | Nguyen et al. | 166/279 |
| 6,832,655 B2 | 12/2004 | Ravensbergen et al. | |
| 6,837,309 B2 | 1/2005 | Boney et al. | |
| 6,851,474 B2 | 2/2005 | Nguyen | 166/279 |
| 6,866,099 B2 | 3/2005 | Nguyen | |
| 6,881,709 B2 * | 4/2005 | Nelson et al. | 507/203 |
| 6,887,834 B2 | 5/2005 | Nguyen et al. | 507/221 |
| 6,928,709 B2 | 8/2005 | Nguyen et al. | 29/281.1 |
| 6,962,200 B2 | 11/2005 | Nguyen et al. | |
| 6,978,836 B2 | 12/2005 | Nguyen et al. | 166/295 |
| 6,997,259 B2 | 2/2006 | Nguyen | |
| 7,007,752 B2 | 3/2006 | Reddy et al. | 166/285 |
| 7,013,976 B2 | 3/2006 | Nguyen et al. | 166/281 |
| 7,017,665 B2 | 3/2006 | Nguyen et al. | 166/281 |
| 7,025,134 B2 | 4/2006 | Byrd et al. | 166/105 |
| 7,032,667 B2 | 4/2006 | Nguyen et al. | 166/280.2 |
| 7,036,589 B2 | 5/2006 | Nguyen | |
| 7,040,403 B2 | 5/2006 | Nguyen et al. | 166/281 |
| 7,059,406 B2 | 6/2006 | Nguyen et al. | 166/281 |
| 7,063,150 B2 | 6/2006 | Slabaugh et al. | |
| 7,066,258 B2 | 6/2006 | Justus et al. | |
| 7,073,581 B2 | 7/2006 | Nguyen et al. | 166/280.2 |
| 7,080,688 B2 | 7/2006 | Todd et al. | |
| 7,081,439 B2 | 7/2006 | Sullivan et al. | |
| 7,104,325 B2 | 9/2006 | Nguyen et al. | |
| 7,114,570 B2 | 10/2006 | Nguyen et al. | 166/295 |
| 7,131,491 B2 | 11/2006 | Blauch et al. | 166/280.2 |
| 7,153,575 B2 | 12/2006 | Anderson et al. | |
| 7,156,194 B2 | 1/2007 | Nguyen et al. | 175/72 |
| 2001/0016562 A1 | 8/2001 | Muir et al. | 507/201 |
| 2002/0036088 A1 | 3/2002 | Todd | |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2002/0104217 A1 | 8/2002 | Echols et al. | |
| 2002/0160920 A1 | 10/2002 | Dawson et al. | |
| 2002/0169085 A1 * | 11/2002 | Miller et al. | 507/200 |

| | | | | | | |
|---|---|---|---|---|---|---|
| 2002/0189808 A1 | 12/2002 | Nguyen et al. | | 2006/0124303 A1 | 6/2006 | Nguyen et al. ............... 427/212 |
| 2003/0006036 A1 | 1/2003 | Malone et al. | | 2006/0157243 A1 | 7/2006 | Nguyen et al. ............ 166/280.2 |
| 2003/0013871 A1 | 1/2003 | Mallon et al. | | 2006/0175058 A1 | 8/2006 | Nguyen et al. ............ 166/280.1 |
| 2003/0060374 A1 | 3/2003 | Cooke, Jr. ...................... 507/200 | | | | |
| 2003/0106690 A1 | 6/2003 | Boney et al. | | | | |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2298440 A  * | 2/1996 |
| GB | 2298440 | 9/1996 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 00/05302  * | 2/2000 |
| WO | WO00/05302 | 2/2000 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/009956 | 1/2004 |
| WO | WO 2004/037946 A1 | 5/2004 |
| WO | WO 2004/038176 A1 | 5/2004 |
| WO | WO 2005/021928 A2 | 3/2005 |

Full US application publication list:

| | | | |
|---|---|---|---|
| 2003/0114314 A1 | 6/2003 | Ballard et al. ................ 507/100 |
| 2003/0114317 A1 | 6/2003 | Benton et al. |
| 2003/0130133 A1 | 7/2003 | Vollmer ....................... 507/100 |
| 2003/0131999 A1 | 7/2003 | Nguyen et al. ................ 166/280 |
| 2003/0148893 A1 | 8/2003 | Lungofer et al. ............. 507/200 |
| 2003/0186820 A1 | 10/2003 | Thesing ........................ 507/200 |
| 2003/0188766 A1 | 10/2003 | Banerjee et al. ................... 134/7 |
| 2003/0188872 A1 | 10/2003 | Nguyen et al. ................ 166/308 |
| 2003/0196805 A1 | 10/2003 | Boney et al. .................. 166/280 |
| 2003/0205376 A1 | 11/2003 | Ayoub et al. ................ 166/254.2 |
| 2003/0230408 A1 | 12/2003 | Acock et al. .................. 166/297 |
| 2003/0230431 A1 | 12/2003 | Reddy et al. |
| 2003/0234103 A1 | 12/2003 | Lee et al. ....................... 166/293 |
| 2004/0000402 A1 | 1/2004 | Nguyen et al. ................ 166/280 |
| 2004/0014607 A1 | 1/2004 | Sinclair et al. ............... 507/200 |
| 2004/0014608 A1 | 1/2004 | Nguyen et al. ............... 507/200 |
| 2004/0040706 A1 | 3/2004 | Hossaini et al. ............. 166/278 |
| 2004/0040708 A1 | 3/2004 | Stephenson et al. ........ 166/280.1 |
| 2004/0040712 A1 | 3/2004 | Ravi et al. |
| 2004/0040713 A1 | 3/2004 | Nguyen et al. ................ 166/295 |
| 2004/0043906 A1 * | 3/2004 | Heath et al. ................... 507/200 |
| 2004/0045712 A1 | 3/2004 | Eoff et al. |
| 2004/0048752 A1 | 3/2004 | Nguyen et al. ............... 507/269 |
| 2004/0055747 A1 | 3/2004 | Lee ............................... 166/278 |
| 2004/0060702 A1 * | 4/2004 | Kotlar et al. .................. 166/304 |
| 2004/0106525 A1 | 6/2004 | Willbert et al. .............. 507/200 |
| 2004/0138068 A1 | 7/2004 | Rimmer et al. .............. 507/100 |
| 2004/0149441 A1 | 8/2004 | Nguyen et al. ............ 166/280.1 |
| 2004/0152601 A1 | 8/2004 | Still et al. ..................... 507/100 |
| 2004/0152602 A1 | 8/2004 | Boles |
| 2004/0162224 A1 | 8/2004 | Nguyen et al. |
| 2004/0177961 A1 | 9/2004 | Nguyen et al. ............ 166/280.2 |
| 2004/0194961 A1 | 10/2004 | Nguyen et al. ................ 166/295 |
| 2004/0206499 A1 | 10/2004 | Nguyen et al. ............ 166/280.2 |
| 2004/0211559 A1 | 10/2004 | Nguyen et al. ................ 166/276 |
| 2004/0211561 A1 | 10/2004 | Nguyen et al. ............ 166/280.2 |
| 2004/0221992 A1 | 11/2004 | Nguyen et al. ................ 166/295 |
| 2004/0231845 A1 | 11/2004 | Cooke, Jr. ..................... 166/279 |
| 2004/0231847 A1 | 11/2004 | Nguyen et al. ................ 166/295 |
| 2004/0256097 A1 | 12/2004 | Byrd et al. |
| 2004/0256099 A1 | 12/2004 | Nguyen et al. ................ 166/249 |
| 2004/0261993 A1 | 12/2004 | Nguyen |
| 2004/0261995 A1 | 12/2004 | Nguyen et al. ................ 166/279 |
| 2004/0261997 A1 | 12/2004 | Nguyen et al. ................ 166/281 |
| 2004/0261999 A1 | 12/2004 | Nguyen |
| 2005/0000694 A1 | 1/2005 | Dalrymple et al. |
| 2005/0000731 A1 | 1/2005 | Nguyen et al. ................... 175/57 |
| 2005/0006093 A1 | 1/2005 | Nguyen et al. ................ 166/281 |
| 2005/0006095 A1 | 1/2005 | Justus et al. .................. 166/295 |
| 2005/0006096 A1 | 1/2005 | Nguyen et al. ................ 166/295 |
| 2005/0028976 A1 | 2/2005 | Nguyen |
| 2005/0034862 A1 | 2/2005 | Nguyen |
| 2005/0034865 A1 | 2/2005 | Todd et al. |
| 2005/0045326 A1 | 3/2005 | Nguyen ........................ 166/278 |
| 2005/0045330 A1 | 3/2005 | Nguyen et al. |
| 2005/0045384 A1 | 3/2005 | Nguyen |
| 2005/0051331 A1 | 3/2005 | Nguyen et al. ................ 166/292 |
| 2005/0059555 A1 | 3/2005 | Dusterhoft et al. ........ 166/280.1 |
| 2005/0061509 A1 | 3/2005 | Nguyen et al. ............ 166/280.2 |
| 2005/0092489 A1 | 5/2005 | Welton et al. ................ 166/295 |
| 2005/0145385 A1 | 7/2005 | Nguyen et al. ................ 166/279 |
| 2005/0173116 A1 | 8/2005 | Nguyen et al. ................ 523/130 |
| 2005/0194142 A1 | 9/2005 | Nguyen et al. ................ 166/281 |
| 2005/0197258 A1 | 9/2005 | Nguyen et al. ................ 507/209 |
| 2005/0263283 A1 | 12/2005 | Nguyen et al. ................ 166/281 |
| 2005/0267001 A1 | 12/2005 | Weaver et al. ................ 507/200 |
| 2005/0269086 A1 | 12/2005 | Nguyen et al. ................ 166/281 |
| 2005/0269101 A1 | 12/2005 | Stegent et al. .............. 166/308.2 |
| 2005/0277554 A1 | 12/2005 | Blauch et al. ................ 507/224 |
| 2005/0284637 A1 | 12/2005 | Stegent et al. .............. 166/308.1 |
| 2006/0048943 A1 | 3/2006 | Parker et al. .............. 166/280.2 |
| 2006/0048944 A1 | 3/2006 | Van Batenburg et al. . 166/308.1 |
| 2006/0052251 A1 * | 3/2006 | Anderson et al. ............. 507/103 |
| 2006/0089266 A1 | 4/2006 | Dusterhoft et al. ........ 166/280.2 |

OTHER PUBLICATIONS

Halliburton, *Conductivity Endurance Technology for High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages.

Halliburton "CobraFrac$^{SM}$ Service, Coiled Tubing Fracturing—Cost-Effective Method for Stimulating Untapped Reserves", 2 pages, 2004.

Halliburton "CobraJetFrac$^{SM}$ Service, Cost-Effective Technology That Can Help Reduce Cost per BOE Produced, Shorten Cycle time and Reduce Capex".

Halliburton Cobra Frac Advertisement, 2001.

Halliburton "SurgiFrac$^{SM}$ Service, a Quick and cost-Effective Method to Help Boost Production From Openhole Horizontal Completions", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Nguyen et al., *A Novel Approach for Enhancing Proppant Consolidation: Laboratory Testing and Field Applications*, SPE Paper No. 77748, 2002.

SPE 15547, *Field Application of Lignosulfonate Gels to Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation by Pressure Pulse"*, SPE 63035, 2000.

Nguyen et al., *New Guidelines for Applying Curable Resin-Coated Proppants*, SPE Paper No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Characterization of Substituted Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch.12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective in Level 1 Dual-Lateral Completion"* SPE 78697, 2002.

Albertsson et al.,*"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid for High-Temperature Applications"*, SPE 80236, 2003.

*Chelating Agents*, Encyclopedia of Chemical Technology, vol. 5 (764-795).

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, *"What is Coalbed Methane?"* CDX, LLC. Available @ www.cdxgas.com/what.html, printed p. 1.

Halliburton brochure entitled "H2Zero™ Service Introducing the Next Generation of cost-Effective Conformance Control Solutions", 2002.

Halliburton brochure entitled INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

S. W. Almond, et al., *"Factors Affecting Proppant Flowback With Resin Coated Proppants,"* Society of Petroleum Engineers, Inc., SPE 30096, p. 171-186, 1995.

Lewis, Richard J., Sr. (2002) Hawley's Condensed Chemical Dictionary (14th Edition), John Wiley & Sons, online@http://knovel.com/web/portal/browse/display?_EXT_KNOVEL_DISPLAY_bookid=704&VerticalID=0, headword=A-stage resin, (Knovel Release Date: Sep. 4, 2003; downloaded Aug. 26, 2012), pp. 1.

* cited by examiner

METHODS OF TRACKING FLUIDS PRODUCED FROM VARIOUS ZONES IN A SUBTERRANEAN WELL

CROSS-REFERENCE TO RELATED APPLICATIONS

This application is a divisional application of Ser. No. 10/298,825 now U.S. Pat. No. 6,725,926, filed Nov. 18, 2002, the entire disclosure of which is incorporated herein by reference, and which itself is a continuation-in-part of Ser. No. 10/125,171 now U.S. Pat. No. 6,691,780, filed Apr. 18, 2002, the entire disclosure of which is incorporated herein by reference.

BACKGROUND

The present embodiment relates generally to the recovery of hydrocarbons from a subterranean formation penetrated by a well bore and more particularly to non-radioactive compositions and methods of utilizing the non-radioactive compositions for determining the source of treatment fluids being produced from a production formation having multiple zones. For example, the compositions and methods can be utilized for tracking the transport of particulate solids during the production of hydrocarbons from a subterranean formation penetrated by a well bore.

Transport of particulate solids during the production of hydrocarbons from a subterranean formation penetrated by a well bore is a continuing problem. The transported solids can erode or cause significant wear in the hydrocarbon production equipment used in the recovery process. The solids also can clog or plug the well bore thereby limiting or completely stopping fluid production. Further, the transported particulates must be separated from the recovered hydrocarbons adding further expense to the processing. The particulates which are available for transport may be present due to an unconsolidated nature of a subterranean formation and/or as a result of well treatments placing particulates in a well bore or formation, such as, by gravel packing or propped fracturing.

In the treatment of subterranean formations, it is common to place particulate materials as a filter medium and/or a proppant in the near well bore area and in fractures extending outwardly from the well bore. In fracturing operations, proppant is carried into fractures created when hydraulic pressure is applied to these subterranean rock formations to a point where fractures are developed. Proppant suspended in a viscosified fracturing fluid is carried outwardly away from the well bore within the fractures as they are created and extended with continued pumping. Upon release of pumping pressure, the proppant materials remain in the fractures holding the separated rock faces in an open position forming a channel for flow of formation fluids back to the well bore.

Proppant flowback is the transport of proppants back into the well bore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel.

Current techniques for controlling the flowback of proppants include coating the proppants with curable resin, or blending the proppants with fibrous materials, tackifying agents or deformable particulates (See e.g. U.S. Pat. No. 6,328,105 to Betzold, U.S. Pat. No. 6,172,011 to Card et al. and U.S. Pat. No. 6,047,772 to Weaver et al.) For a multi-zone well that has been fractured with proppant and is plagued with proppant flowback problems, it is quite difficult to identify the zone from which the proppant is emanating unless the proppant is tagged with a tracer. Radioactive materials have been commonly used in the logging or tagging of sand or proppant placement, however, such radioactive materials are hazardous to the environment and the techniques for utilizing such radioactive materials are complex, expensive and time consuming. Therefore, there is a need for simple compositions and methods for tracking the flowback of proppant in subterranean wells to avoid the above problems.

DETAILED DESCRIPTION

According to one embodiment, to determine from which zone(s) a fluid is being produced, a water soluble inorganic or organic salt is dissolved in the base treatment fluid as the fluid is being pumped downhole during the treatment. Such treatment fluids include but are not limited to fracturing fluids, drilling fluids, disposal fluids and injection fluids used as displacement fluids in hydrocarbon recovery processes. Acting as a fluid tracer agent, a salt is tagged into the fluid that is unique for each treatment job such as a fracturing job treatment. Suitable water soluble salts for this purpose are metal salts in which the metal is selected from Groups I to VIII of the Periodic Table of the Elements as well as the lanthanide series of rare earth metals so long as the metal salts do not constitute a component of fluids naturally present in the formation and are compatible with the fluids injected into the formation. Preferred metals include barium, beryllium, cadmium, chromium, cesium, sodium, potassium, manganese and zinc. Particularly preferred water soluble salts include barium bromide, barium iodide, beryllium fluoride, beryllium bromide, beryllium chloride, cadmium bromide, cadmium chloride, cadmium iodide, cadmium nitrate, chromium bromide, chromium chloride, chromium iodide, cesium bromide, cesium chloride, sodium bromide, sodium iodide, sodium nitrate, sodium nitrite, potassium iodide, potassium nitrate, manganese bromide, manganese chloride, zinc bromide, zinc chloride, zinc iodide, sodium monofluoroacetate, sodium trifluoroacetate, sodium 3-fluoropropionate, potassium monofluoroacetate, potassium trifluoroacetate, potassium 3-fluoropropionate.

The fluid tracer agents used in the method of this embodiment must meet a number of requirements. They should be relatively inexpensive, must be compatible with fluids naturally present in the reservoir and within the rock itself, as well as be compatible with the fluids injected into the reservoir as part of the formation treatment. The fluid tracer agents must be susceptible to being readily detected qualitatively and analyzed quantitatively in the presence of the materials naturally occurring in the formation fluids. For example, an aqueous sodium chloride solution could be utilized as a fluid tracer agent but for the fact that most field brines contain sodium chloride in substantial quantities, and so detection and analysis to differentiate the presence of sodium chloride used as tracer in the presence of naturally-occurring sodium chloride would be difficult.

In field application, a known amount of a selected water soluble salt based on a known concentration (i.e. 100 parts per million) is dissolved in a volume of water which is $\frac{1}{1,000}$ of the total actual volume of base fluid required for the treatment. The mixed solution is then metered to the base fluid line at a rate of one gallon per 1,000 gallons of the base fluid. To handle multiple zones, various salts can be used provided that the interest cations or anions of selected compounds are unique to prevent any interference between zones.

According to another embodiment, metals are tagged onto proppant material or materials to be blended with proppant material to provide for the ready identification of flowback proppant from different stages or zones of the well. Suitable metals for this purpose may be selected from Groups I to VIII of the Periodic Table of the elements as well as the lanthanide series of rare earth metals so long as the metals do not constitute a component of the proppant, the fracturing fluid or the reservoir fluid and so long as the metals are compatible with the fracturing fluid. Preferred metals include gold, silver, copper, aluminum, barium, beryllium, cadmium, cobalt, chromium, iron, lithium, magnesium, manganese, molybdenum, nickel, phosphorus, lead, titanium, vanadium and zinc as well as derivatives thereof including oxides, phosphates, sulfates, carbonates and salts thereof so long as such derivatives are only slightly soluble in water so that they remain intact during transport with the proppant from the surface into the fractures. Particularly preferred metals include copper, nickel, zinc, cadmium, magnesium and barium. The metal acts as a tracer material and a different metal is tagged onto the proppant, or onto the materials to be blended with the proppant, so that each proppant stage or each fracturing job treatment can be identified by a unique tracer material. Suitable metals for use as the tracer material are generally commercially available from Sigma-Aldrich, Inc. as well as from Mallinckrodt Baker, Inc. It is understood, however, that field grade materials may also be used as suitable tracer materials for tagging onto proppant material or materials to be blended with proppant material.

Samples of flowback proppant collected from the field may be analyzed according to a process known as the inductively-coupled plasma (ICP) discharge method to determine from which proppant stage and which production zone the proppant has been produced. According to the ICP discharge method, an aqueous sample is nebulized within an ICP spectrometer and the resulting aerosol is transported to an argon plasma torch located within the ICP spectrometer. The ICP spectrometer measures the intensities of element-specific atomic emissions produced when the solution components enter the high-temperature plasma. An on-board computer within the ICP spectrometer accesses a standard calibration curve to translate the measured intensities into elemental concentrations. ICP spectrometers for use according to the ICP discharge method are generally commercially available from the Thermo ARL business unit of Thermo Electron Corporation, Agilent Technologies and several other companies. Depending upon the model and the manufacturer, the degree of sensitivity of currently commercially available ICP spectrometers can generally detect levels as low as 1 to 5 parts per million for most of the metals listed above.

It is understood that depending on the materials used as tagging agents, other spectroscopic techniques well known to those skilled in the art, including atomic absorption spectroscopy, X-ray fluorescence spectroscopy, or neutron activation analysis, can be utilized to identify these materials.

According to yet another embodiment, an oil-soluble or oil-dispersible tracer comprising a metal salt, metal oxide, metal sulfate, metal phosphate or a metal salt of an organic acid can be used to tag the proppant by intimately mixing the metal with a curable resin prior to coating the curable resin onto the proppant. Preferably, the metal is selected from the Group VIB metals, the Group VIIB metals, and the lanthanide series of rare earth metals. Specifically, the metal according to this embodiment may be chromium, molybdenum, tungsten, manganese, technetium, rhenium, lanthanum, cerium, praseodymium, neodymium, promethium, samarium, europium, gadolinium, terbium, dysprosium, holmium, erbium, thulium, ytterbium and lutetium. It is preferred that the metals according to this embodiment, do not constitute a component of the proppant, the fracturing fluid or the reservoir fluid, and that the metals are compatible with the fracturing fluid.

Preferably, the organic acid is a substituted or unsubstituted carboxylic acid. More preferably, the organic acid may be selected from alkanoic and alkenoic carboxylic acids, polyunsaturated aliphatic monocarboxylic acids and aromatic carboxylic acids. Most preferably, the alkanoic carboxylic acids have from 5 to 35 carbon atoms, the alkenoic carboxylic acids have from 5 to 30 carbon atoms, the polyunsaturated aliphatic monocarboxylic acids may be selected from the group of sorbic, linoleic, linolenic, and eleostearic acids and the aromatic acids maybe selected from the group of benzoic, salicylic, cinnarnic and gallic acids. Suitable organic acids are generally commercially available from Sigma-Aldrich, Inc. as well as from Mallinckrodt Baker, Inc.

For proppant to be coated with a curable resin, the tracer agent is blended homogeneously with the resin mixture and the resin is then coated onto the proppant. The proppant can be pre-coated as in the case of curable resin-coated proppants, for example, such as those commercially available from Santrol or Acme Borden, or it can be coated on-the-fly during the fracturing job treatment. The nature of the resin materials and the processes for performing the coating process is well know to those skilled in the art, as represented by U.S. Pat. No. 5,609,207 to Dewprashad et al., the entire disclosure of which is hereby incorporated herein by reference. Also, it is understood that materials to be blended with proppant such as the fibrous materials, tackifying agents or deformable beads disclosed in U.S. Pat. No. 6,328,105 to Betzold, U.S. Pat. No. 6,172,011 to Card et al. and U.S. Pat. No. 6,047,772 to Weaver et al., the entire disclosures of which are hereby incorporated by reference, can be similarly treated with a tracer agent.

According to still another embodiment, the metal elements or their derivative compounds can be tagged as part of the manufacturing process of proppant. As a result, the proppant is tagged with a permanent tracer.

According to yet another embodiment, the proppant can be coated with phosphorescent, fluorescent, or photoluminescent pigments, such as those disclosed in U.S. Pat. No. 6,123,871 to Carroll, U.S. Pat. No. 5,498,280 to Fistner et al. and U.S. Pat. No. 6,074,739 to Katagiri, the entire disclosures of which are hereby incorporated herein by reference. According to this embodiment, the phosphorescent, fluorescent, or photoluminescent pigments maybe prepared from materials well known to those skilled in the art including but not limited to alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors. Suitable phosphorescent, fluorescent and photoluminescent materials are commercially available from Keystone Aniline Corporation (TB Series) and Capricorn Chemicals (H Series and S Series Glowbug Specialty Pigments). The particular structure of the materials has a strong capacity to absorb and store visible light such as sunlight or light from artificial lighting. After absorbing a variety of such common visible light the phosphorescent, fluorescent, or photoluminescent materials will glow in the dark. Various pigment colors can be combined with the luminescent capability of the materials to enhance the differentiation of the stages or zones. According to this embodiment, micron sized particles of the phosphorescent, fluorescent, or photoluminescent materials are intimately mixed with a resin to be coated onto a proppant to be used in a fracturing treatment.

According to still another embodiment, proppant materials having a naturally dark color can be dyed or coated with a marker material having a bright, vivid and intense color which marker material may be selected from oil soluble dyes, oil dispersible dyes or oil dispersible pigments. Suitable oil soluble dyes, oil dispersible dyes and oil dispersible pigments are well known to those skilled in the art and are generally commercially available from Keystone Aniline Corporation and Abbey Color. According to this embodiment, proppant materials having a dark color, such as bauxite proppant which is naturally black in color, are dyed or coated with such marker materials. In this regard, reference is made to the dyes disclosed in U.S. Pat. No. 6,210,471 to Craig, the entire disclosure of which is hereby incorporated herein by reference.

According to all of the above-described embodiments, the proppant material may comprise substantially any substrate material that does not undesirably chemically interact with other components used in treating the subterranean formation. It is understood that the proppant material may comprise sand, ceramics, glass, sintered bauxite, resin coated sand, resin beads, metal beads and the like.

The following examples are illustrative of the methods and compositions discussed above.

EXAMPLE 1

$ZnCl_2$ was selected to tag 50,000 gallons of a base fracturing fluid. For a 100-ppm concentration of $ZnCl_2$ in the fracturing fluid, it requires 0.2084 gram per liter of fluid, or 39.44 kg for the total fluid volume. This amount of $ZnCl_2$ is dissolved in 50 gallons of fluid, and the mixed solution is metered into the base fluid line at a rate of 1 gallon for every 1,000 gallons of the base fluid.

A number of methods well known to those of ordinary skill in the art such as wet chemistry titration, colorimetry, atomic absorption spectroscopy, inductively coupled plasma (ICP) discharge, ion chromatography (IC), gas chromatography (GC), liquid chromatography (LC) and nuclear magnetic resonance (NMR), can be used to analyze the fluid samples produced from the well and to determine from which zones the fluid has been produced, and the theoretical production level of each zone in the well.

EXAMPLE 2

A total of three separate hydraulic fracturing treatments were performed in a subterranean formation penetrated by a well bore. For each fracturing treatment, sufficient metal tracer was added to a liquid hardenable resin to provide an initial concentration of 1000 ppm of the metal tracer in the resin treated proppant. Cuprous oxide, manganese oxide, and zinc oxide were used as tagging agents in fracturing treatments 1, 2, and 3, respectively. Samples of flowback proppant were collected during the flow back of the well. Each proppant sample was weighted and digested in concentrated nitric acid before being measured against known, calibrated metal concentrations according to the inductively coupled plasma (ICP) discharge method for the ARL Model 3410 ICP which is commercially available from the Thermo ARL business unit of Thermo Electron Corporation. Table 1 shows the concentrations of each metal obtained in each proppant flowback sample. The data indicated that the highest concentration of flowback proppant was produced from the interval of the well that was fractured in the second fracturing treatment.

TABLE 1

| Sample Number | Frac Treatment 1 Cu (ppm) | Frac Treatment 2 Mn (ppm) | Frac Treatment 3 Zn (ppm) |
|---|---|---|---|
| 1 | 1.9 | 217.3 | 11.5 |
| 2 | 2 | 219.2 | 11.8 |
| 3 | 2.8 | 120.5 | 9.1 |
| 4 | 3.1 | 204.1 | 12 |
| 5 | 670.6 | 382 | 24.1 |
| 6 | 51.6 | 214.1 | 15.3 |
| 7 | 7.3 | 234.5 | 13.3 |
| 8 | 2.7 | 437.7 | 17.1 |
| 9 | 2.3 | 183.8 | 11.9 |
| 10 | 2.7 | 220.2 | 12.8 |
| 11 | 2.9 | 465 | 19.3 |
| 12 | 2.1 | 408.1 | 17.4 |
| 13 | 2.7 | 577.2 | 19.3 |
| 14 | 3.1 | 410.2 | 18.2 |
| 15 | 2.3 | 342.9 | 40.2 |
| 16 | 2.1 | 299.8 | 14.9 |
| 17 | 6.5 | 296.8 | 12.5 |
| 18 | 2.1 | 494.8 | 18 |
| 19 | 51 | 385.8 | 16.5 |
| 20 | 2.7 | 443.8 | 17 |
| 21 | 2.8 | 564.8 | 44.6 |
| 22 | 35.5 | 551.8 | 16.1 |
| 23 | 2.4 | 545.8 | 23.3 |
| 24 | 2 | 538.8 | 14.7 |
| 25 | 181 | 342.8 | 16.6 |
| 26 | 1.5 | 119.8 | 10.3 |
| 27 | 1.4 | 34.8 | 11.9 |
| 28 | 1.9 | 204.8 | 43.2 |
| 29 | 2 | 240.8 | 13.7 |
| 30 | 2.4 | 175.8 | 11.3 |
| 31 | 7.5 | 171.8 | 10.9 |
| 32 | 2.3 | 57.8 | 7.7 |
| 33 | 5.8 | 192.8 | 17 |
| 34 | 1.7 | 188.8 | 12.1 |
| 35 | 1.9 | 115.8 | 9.6 |
| 36 | 2.1 | 168.9 | 11.1 |
| 37 | 1.6 | 245.3 | 13 |
| 38 | 1.7 | 173.9 | 11.6 |
| 39 | 1.9 | 219.4 | 12.9 |
| 40 | 1.9 | 224.6 | 12.6 |
| 41 | 2 | 383.3 | 17.1 |
| 42 | 1.7 | 284.7 | 12.5 |
| 43 | 1.9 | 270.6 | 13.4 |
| 44 | 2.4 | 311 | 12.7 |
| 45 | 1.9 | 177.1 | 10.3 |
| 46 | 1.8 | 304.2 | 12.9 |
| 47 | 2.4 | 343.2 | 13.3 |
| 48 | 2 | 308.2 | 12.6 |
| 49 | 5.4 | 241.6 | 11.2 |
| 50 | 3.4 | 209.1 | 11.4 |
| 51 | 3.3 | 217.1 | 11.1 |
| 52 | 1.9 | 299.7 | 12.7 |
| 53 | 2.3 | 228.6 | 11.4 |
| 54 | 1.5 | 162.8 | 10.1 |

EXAMPLE 3

A total of five separate hydraulic fracturing treatments were performed in a subterranean formation penetrated by a well bore. For each fracturing treatment, sufficient metal tracer was added to the liquid hardenable resin to provide an initial concentration of 1000 ppm of the metal tracer in the resin treated proppant. Manganese oxide, cuprous oxide, zinc oxide, magnesium oxide, and barium oxide were used as tagging agents in fracturing treatments 1 through 5, respectively. Samples of flowback proppant were collected during the flow back of the well. Each proppant sample was weighted and digested in concentrated nitric acid before being measured against known, calibrated metal concentrations according to the inductively coupled plasma (ICP) discharge method for the ARL Model 3410 ICP which is commercially available from the Thermo ARL business unit of Thermo Electron Corporation. Table 2 shows the concentrations of each metal obtained in each proppant flowback sample. The data indicated that the highest concentration of flowback proppant was produced from the intervals of the well that were fractured in fracturing treatments 1 and 5.

TABLE 2

| Sample Number | Frac Treatment 1 Mn (ppm) | Frac Treatment 2 Cu (ppm) | Frac Treatment 3 Zn (ppm) | Frac Treatment 4 Mg (ppm) | Frac Treatment 5 Ba (ppm) |
|---|---|---|---|---|---|
| 1 | 256.9 | 7.3 | 18.2 | 26.8 | 106.2 |
| 2 | 210.3 | 14.5 | 23.1 | 24 | 110.6 |
| 3 | 164.5 | 12.4 | 20.2 | 22.5 | 94.8 |
| 4 | 236.5 | 9.1 | 19.9 | 23.3 | 100.4 |
| 5 | 97.8 | 10.5 | 14.7 | 19 | 105.7 |
| 6 | 288.9 | 2.8 | 15.8 | 25.4 | 110.4 |
| 7 | 202.8 | 172.8 | 12.1 | 21.3 | 99.7 |
| 8 | 221.3 | 3 | 12.8 | 22.3 | 115.9 |
| 9 | 167.9 | 2.9 | 12.5 | 21.8 | 115.7 |
| 10 | 236.1 | 2.2 | 12.5 | 22.8 | 90.7 |
| 11 | 162.6 | 1.6 | 10.8 | 19.5 | 85.9 |
| 12 | 111.8 | 1.6 | 8.9 | 18.8 | 74.9 |
| 13 | 231.8 | 1.7 | 11.5 | 21.7 | 86.7 |
| 14 | 246.9 | 2.5 | 13.1 | 24.4 | 98.3 |
| 15 | 348.2 | 2 | 13.5 | 26.8 | 112.8 |
| 16 | 273.5 | 2.4 | 12.4 | 24.4 | 101 |
| 17 | 221.5 | 2 | 11.4 | 29.3 | 83.8 |
| 18 | 268 | 1.4 | 11.9 | 25.8 | 88.4 |
| 19 | 177.8 | 1.8 | 10.4 | 22.3 | 77.8 |
| 20 | 247.5 | 2.4 | 11.3 | 28 | 92.2 |
| 21 | 132.8 | 1.8 | 10 | 22.2 | 72.4 |
| 22 | 165.8 | 2.3 | 9.4 | 20.9 | 75.3 |
| 23 | 306.9 | 66.4 | 11.9 | 28.7 | 103.8 |
| 24 | 205.7 | 1.6 | 9.4 | 23 | 87.1 |
| 25 | 241.2 | 2.6 | 10.6 | 23.4 | 90.4 |
| 26 | 197.6 | 2.2 | 10.1 | 24.1 | 88 |
| 27 | 242 | 2.3 | 10.7 | 26.2 | 98.9 |
| 28 | 202.8 | 3 | 10.8 | 24.6 | 94.6 |
| 29 | 165.7 | 2 | 9 | 20.7 | 85.5 |
| 30 | 138.3 | 1.4 | 8.7 | 21.3 | 76.1 |
| 31 | 227.4 | 1.5 | 10.3 | 24 | 92.8 |
| 32 | 192.1 | 1.7 | 9.8 | 23.5 | 86.6 |
| 33 | 201.9 | 1.2 | 9.6 | 22.3 | 86.4 |
| 34 | 138.4 | 1.7 | 8.6 | 19.8 | 73.9 |

VARIATIONS AND EQUIVALENTS

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A proppant composition comprising a particulate material that has been coated with a coating composition comprising a homogenous blend of a tracking composition and a resin composition, wherein the tracking composition comprises a substantially non-radioactive tracking material selected from the group consisting of:
    a metal salt wherein a metal portion of the metal salt is selected from the group consisting of gold, silver, lithium, molybdenum, and vanadium; and
    a metal salt selected from the group consisting of barium bromide, barium iodide, beryllium fluoride, beryllium bromide, beryllium chloride, cadmium bromide, cadmium iodide, chromium bromide, chromium chloride, chromium iodide, cesium bromide, cesium chloride, sodium bromide, sodium iodide, sodium nitrate, sodium nitrite, potassium iodide, potassium nitrate, manganese bromide, zinc bromide, zinc iodide, sodium monofluoroacetate, sodium trifluoroacetate, sodium 3-fluoropropionate, potassium monofluoroacetate, potassium trifluoroacetate, and potassium 3-fluoropropionate.

2. The proppant composition of claim 1 wherein the particulate material is selected from the group consisting of fibrous materials, tackifying agents, and deformable beads.

3. The proppant composition of claim 1 further comprising a particulate material tagged with the tracking material.

4. A proppant composition comprising particulate material that has been coated with a coating composition comprising a tracking composition and a resin composition, wherein the tracking composition comprises a substantially non-radioactive tracking material selected from the group consisting of:
    a metal salt wherein a metal portion of the metal salt is selected from the group consisting of gold, silver, molybdenum, and vanadium; and
    a metal salt selected from the group consisting of barium bromide, barium iodide, beryllium fluoride, beryllium bromide, beryllium chloride, cadmium bromide, cadmium iodide, chromium bromide, chromium chloride, chromium iodide, cesium bromide, cesium chloride, sodium bromide, sodium iodide, sodium nitrate, sodium nitrite, potassium iodide, potassium nitrate, manganese bromide, zinc bromide, zinc iodide, sodium monofluoroacetate, sodium trifluoroacetate, sodium 3-fluoropropionate, potassium monofluoroacetate, potassium trifluoroacetate, and potassium 3-fluoropropionate.

5. The proppant composition of claim 4 wherein the particulate material is selected from the group consisting of fibrous materials, tackifying agents, and deformable beads.

6. The proppant composition of claim 4 further comprising a particulate material tagged with the tracking material.

7. The proppant composition of claim 4 wherein the resin composition and the tracking composition are a homogenous blend that is coated on the particulate material.

8. A proppant composition comprising a particulate material that has been coated with a coating composition comprising a tracking composition, wherein the tracking composition comprises a substantially non-radioactive tracking material, wherein the substantially non-radioactive tracking material comprises at least one metal salt selected from the group consisting of: barium bromide, barium iodide, beryllium fluoride, beryllium bromide, beryllium chloride, cadmium bromide, cadmium iodide, chromium bromide, chromium chloride, chromium iodide, cesium bromide, cesium chloride, sodium bromide, sodium iodide, sodium nitrate, sodium nitrite, potassium iodide, potassium nitrate, manganese bromide, zinc bromide, zinc iodide, sodium monofluoroacetate, sodium trifluoroacetate, sodium 3-fluoropropionate, potassium monofluoroacetate, potassium trifluoroacetate, and potassium 3-fluoropropionate.

9. The proppant composition of claim 8 wherein the particulate material is selected from the group consisting of fibrous materials, tackifying agents, and deformable beads.

10. The proppant composition of claim 8 further comprising a particulate material tagged with the substantially non-radioactive tracking material.

11. The proppant composition of claim 8 wherein the coating composition further comprises a resin composition.

12. The proppant composition of claim 11 wherein the resin composition and the tracking composition are a homogenous blend that is coated on the particulate material.

* * * * *